United States Patent
Mohr

(10) Patent No.: US 6,175,382 B1
(45) Date of Patent: Jan. 16, 2001

(54) UNMANNED FUELING FACILITY

(75) Inventor: Clyde Ray Mohr, Katy, TX (US)

(73) Assignee: Shell Oil Company, Houston, TX (US)

( * ) Notice: Under 35 U.S.C. 154(b), the term of this patent shall be extended for 0 days.

(21) Appl. No.: 08/977,010

(22) Filed: Nov. 24, 1997

(51) Int. Cl.[7] .............................. H04N 7/18; H04N 9/47
(52) U.S. Cl. ........................................... 348/150; 348/143
(58) Field of Search ................................... 348/143, 180, 348/151, 152, 156, 15, 14; H04N 7/18, 9/47

(56) References Cited

U.S. PATENT DOCUMENTS

| | | | |
|---|---|---|---|
| D. 289,778 | 5/1987 | Thomas | D20/1 |
| D. 295,175 | 4/1988 | Long | D14/105 |
| D. 297,237 | 8/1988 | Long | D14/105 |
| D. 304,198 | 10/1989 | Long | D15/9.1 |
| 4,249,207 * | 2/1981 | Harman et al. | 349/152 |
| 4,337,482 * | 6/1982 | Coutta | 348/151 |
| 4,687,033 | 8/1987 | Furrow et al. | 141/59 |
| 4,876,653 | 10/1989 | McSpadden et al. | 364/479 |
| 4,939,730 | 7/1990 | Tarver | 371/11.1 |
| 4,967,366 | 10/1990 | Kaehler | 364/479 |
| 5,029,100 | 7/1991 | Young et al. | 364/479 |
| 5,053,868 * | 10/1991 | Higgins et al. | 358/93 |
| 5,168,354 * | 12/1992 | Martinez et al. | 358/53 |
| 5,228,084 | 7/1993 | Johnson et al. | 380/23 |
| 5,384,850 | 1/1995 | Johnson et al. | 380/52 |
| 5,441,047 * | 8/1995 | David et al. | 348/93 |
| 5,448,638 | 9/1995 | Johnson et al. | 380/23 |
| 5,493,315 | 2/1996 | Atchley | 345/200 |
| 5,543,849 | 8/1996 | Long | 348/460 |
| 5,602,745 | 2/1997 | Atchley et al. | 364/464.23 |
| 5,619,183 * | 4/1997 | Ziegra | 340/505 |
| 5,844,601 * | 12/1998 | McPheely et al. | 348/143 |

FOREIGN PATENT DOCUMENTS 0 665 971 B1     4/1967   (EP) .............................. G07F/13/02

OTHER PUBLICATIONS

"Video camera only attendant in Shell test," *USA Today.* Published more than one year prior to the filing date of Nov. 24, 1997.

"Shell Oil tests 'gas-and-go' stations," CNN Web Page, Jun. 5, 1996. 2 pages.

"New gas station bypasses clerks," *Chicago Sun times,* Business Section, Sep. 3, 1996.

\* cited by examiner

*Primary Examiner*—Howard Britton
*Assistant Examiner*—Nhon T Diep

(57) ABSTRACT

A vehicle fueling facility is unmanned but remotely monitored. The fueling system, made up of fuel dispensers (with credit/debit card and cash acceptors) and product storage tank(s) is located at a satellite site. The satellite site includes security video cameras which monitor overall activity at the site. An additional video camera is installed in each fuel dispenser head to monitor activities of a customer at that fuel dispenser. The outputs of all security and dispenser video cameras are transmitted to a remote (attended) monitoring site for viewing by an attendant. Still another video camera is trained on the attendant at the remote site so that the attendant's face can be transmitted back to a video monitor located in the fuel dispenser for viewing by the customer. The video surveillance system enables an attendant, who is physically situated at the remote location (i.e., a remote monitoring site which may be several miles from the satellite fueling facility), to visually monitor activity at the fueling facility (i.e., to view images captured by security and dispenser cameras at the satellite site), to transmit video of the attendant to a video monitor located on a fuel dispenser at the satellite site for viewing by a customer, to thereby maintain interactive audio/visual communication with a customer at the fueling facility, and to maintain a temporary audio/video record of activities at the site. Thus, the video/audio intercommunication system enables customers and attendants to maintain interactive visual and voice communication with each other during a refueling operation.

3 Claims, 2 Drawing Sheets

UNMANNED FUELING FACILITY

BACKGROUND OF THE INVENTION

1. Field of the Invention

The invention is directed to video surveillance systems which enable an attendant situated at a remote location to visually monitor (by interactive video) activities at a distant, unmanned, satellite fueling facility, to maintain reciprocal (interactive) audio/visual communication with a customer at such fueling facility and to maintain a temporary audio/video record of activities at the fueling facility.

2. Description of the Prior Art

The system described herein is an improvement of the self-service concept in which an on-site attendant monitors fueling operations and provides assistance when required.

Facilities similar to Assignee's fueling facility described herein are in operation in Dayton, Ohio and Tampa, Florida; however, those latter facilities either have no video surveillance at all or have no video camera in the fuel dispenser (therefore, no interactive video) and no voice intercommunication capability.

An unattended gasoline fueling facility constructed by Gary Williams Energy Corporation of Denver, Colorado, was opened to the public in August of 1996. The facility is located at a Wal-Mart store in a shopping center in Denver, Colo. A Sept. 3, 1996, article from the *Chicago Sun Times* describes the unattended facility. This facility has no interactive video capability.

SUMMARY OF THE INVENTION

A vehicle fueling facility is unmanned but remotely monitored. The fueling system, made up of fuel dispensers (with credit/debit card and cash acceptors) and product storage tank(s) is located at a satellite site. The satellite site includes security video cameras which monitor overall activity at the site. An additional video camera is installed in each fuel dispenser head to monitor activities of a customer at that fuel dispenser. The outputs of all security and dispenser video cameras are transmitted to a remote (attended) monitoring site for viewing by an attendant. Still another video camera is trained on the attendant at the remote site so that the attendant's face can be transmitted back to a video monitor located in the fuel dispenser for viewing by the customer. The video surveillance system enables an attendant, who is physically situated at the remote location (i.e., a remote monitoring site which may be several miles from the satellite fueling facility), to visually monitor activity at the fueling facility (i.e., to view images captured by security and dispenser cameras at the satellite site), to transmit video of the attendant to a video monitor located on a fuel dispenser at the satellite site for viewing by a customer, to thereby maintain interactive audio/visual communication with a customer at the fueling facility, and to maintain a temporary audio/video record of activities at the site. Thus, the video/audio intercommunication system enables customers and attendants to maintain interactive visual and voice communication with each other during a refueling operation.

DESCRIPTION OF THE PREFERRED EMBODIMENTS

Figure 1:
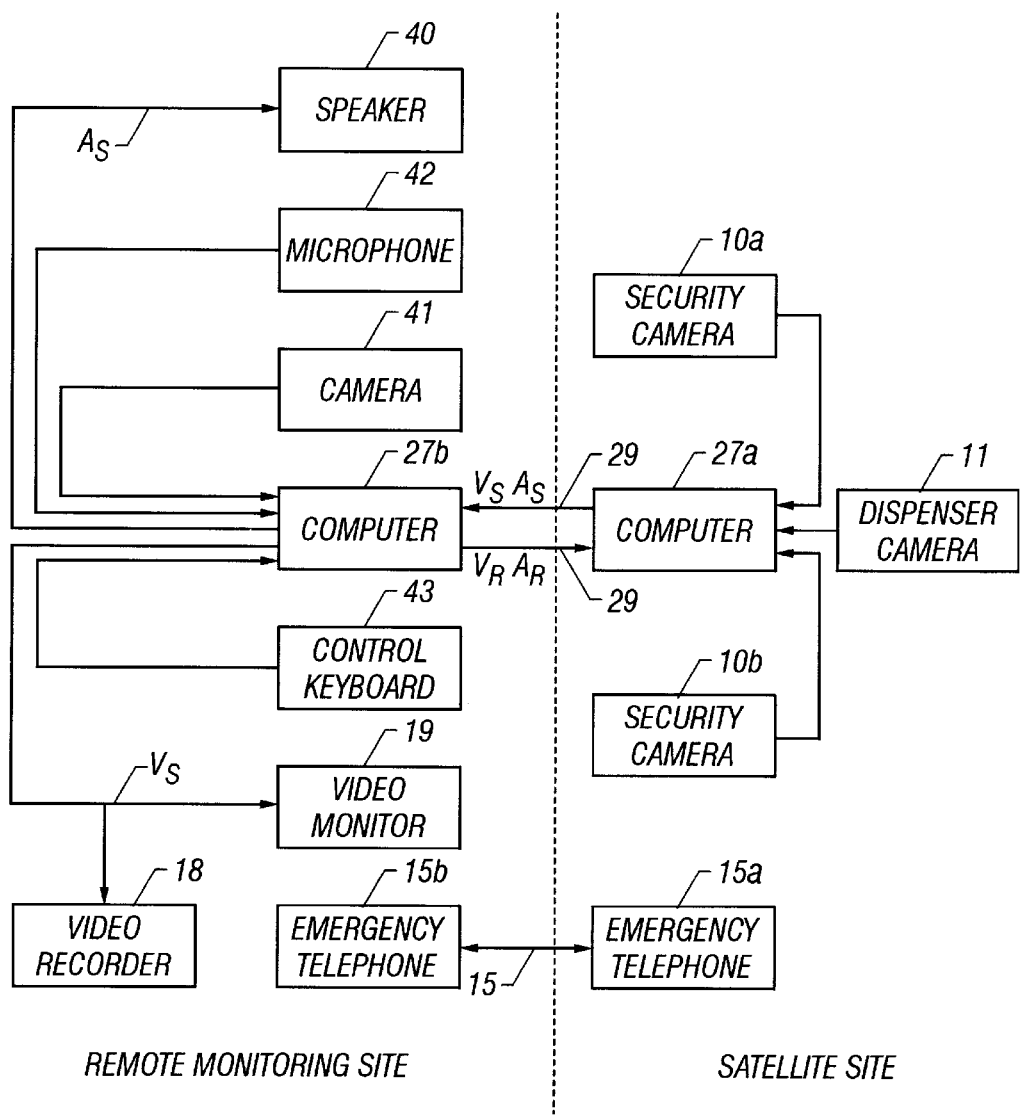
FIG. 1 is a block diagram of the system showing equipment interconnecting the satellite (fueling) facility and the remote (attended) monitoring site.

FIG. 1 is a simplified diagram of the equipment interconnection between the satellite site and the attended remote site. The satellite (fueling) site includes two site surveillance (security) cameras 10a, 10b which capture images of the satellite site including all fueling stations and any automobiles and customers thereat. An additional camera 11 located in each fueling station dispenser 20 (see FIG. 2) captures close-up images of the activities of a customer at a fuel dispenser 20. The outputs of security cameras 10a, 10b and dispenser camera 11 are input to computer 27a via video/audio switch box 25 (shown in, and described with relation to, FIG. 2). The output of computer 27a is relayed to computer 27b at the remote site by an integrated services digital network (ISDN) line 29. Additionally, the video output $V_S$ of computer 27a may be recorded at the remote site on a 24-hour video recorder 18 for viewing by the attendant on video monitor 19 on either a real time or delayed basis. Thus, an attendant at the remote monitoring site may, at his discretion, view events captured by cameras 10a, 10b and 11 at the satellite fueling site (which may be located several miles away) either as they occur or on a delayed basis. Two-way emergency voice communication is available between the attendant and a customer at one of the fuel dispensers by means of non-dial type telephones 15a, 15b connected by dedicated phone line 15. The security cameras 10a, 10b may be, for example, Burle TC-592 high resolution ⅓" CCD cameras equipped with Burle TC-9935 3.5–8.0 mm varifocal lens with direct drive iris. Each of the computers 27a, 27b includes a modem such as e.g., Picture Tel video modem, model No. VM50. The video recorder 18 may be e.g., a VSS-305/C 24-hour time lapse recorder. The security cameras 10a, 10b and the dispenser micro cameras 11 may be any compatible video cameras.

Figure 2:
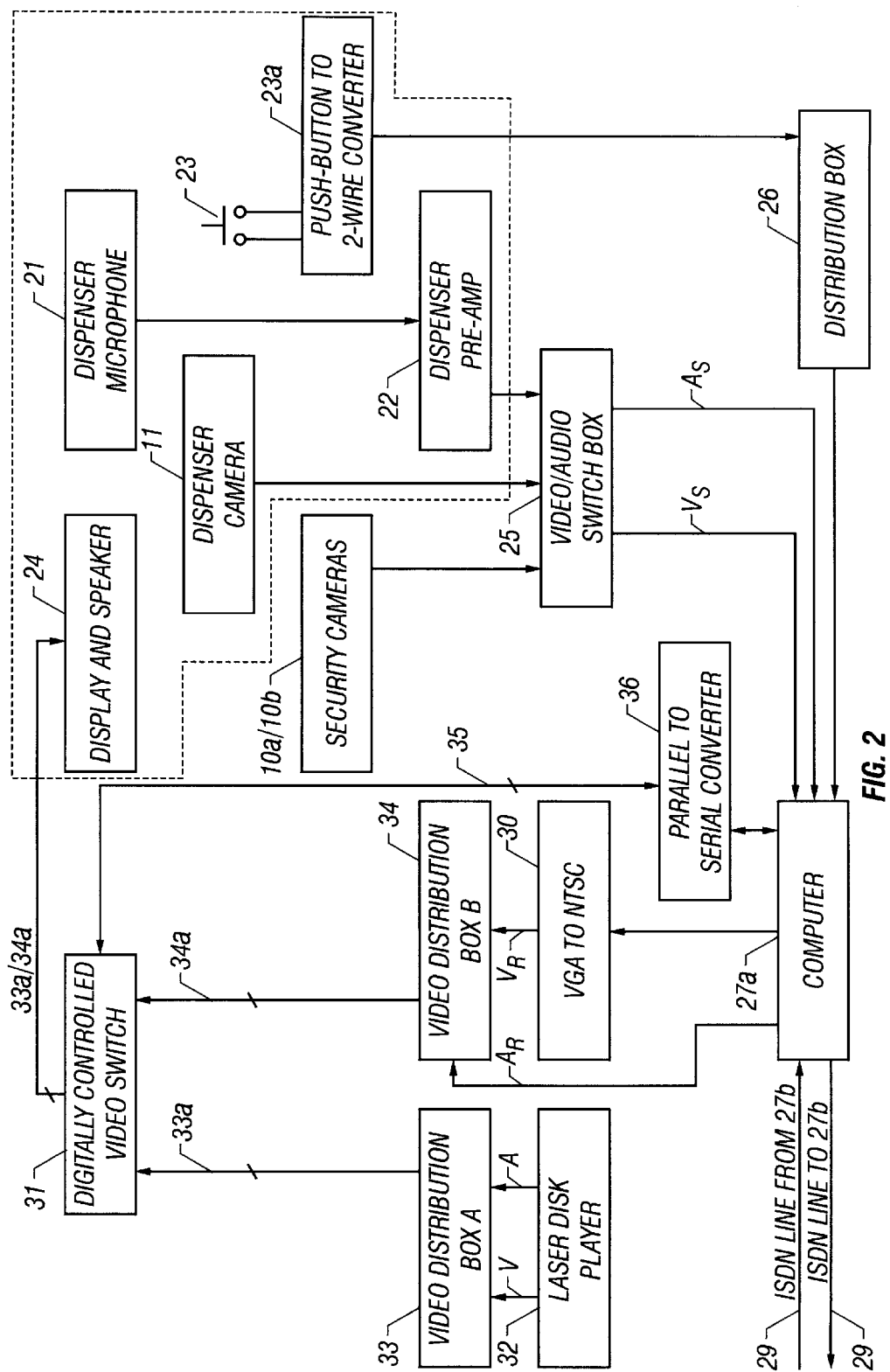
FIG. 2 is a block diagram of the audio/video intercommunication system located at the satellite fueling facility.

Referring now to FIG. 2, the fueling and security system provides for video monitoring of the overall facility as well as close-up viewing of individual customers as they refuel their vehicles. The satellite site equipment 20 enclosed by the dashed line in FIG. 2 indicates half of the equipment which is housed in each fuel dispenser head. That is, a dispenser head includes the usual two opposing and identical fueling stations; however, for convenience and ease of illustration, only one side of the fuel dispenser head will be described herein. Additionally, each satellite site will generally have several (e.g., 4–6) identical fuel dispenser heads. Each side of each dispenser head 20 includes a video display 24 (preferably an InfoScreen™ video display, a trademark of Gilbarco Inc., Greensboro, N.C.), a speaker, which may be integral with the video display 24, a push-to-talk call button 23, microphone 21 with a pre-amplifier 22 and a camera 11. The remainder of the equipment shown outside the solid line of FIG. 2 is located in a separate housing at the satellite site. The security system includes two security cameras 10a, 10b mounted in the separate housing (not shown), for viewing each side of a fueling island, and a dedicated emergency telephone 15a (shown in FIG. 1) located at the satellite site for communication by dedicated telephone line 15 with the attendant by telephone 15b located at the remote site. The security cameras 10a, 10b are positioned on the separate housing so as to provide a broad general view of the area around the fueling islands and fuel dispensers. Additionally, the video surveillance system is complemented by a micro camera 11, located on each side of each fuel dispenser, which provides a close-up view of the activity of a customer at each fueling point. That is, the customer's activity at a fuel dispenser, in particular, his face, is captured by these cameras 11. Images captured by all cameras 10a, 10b and 11 are sent to the remote monitoring location via video/audio switch box 25 and a modem in the personal computer 27a over ISDN line 29. At the remote monitoring site (see FIG. 1), the signals are converted back to images, displayed on a video monitor 19 for viewing by the attendant and temporarily stored in a video recorder 18.

A computer 27b (which may be identical to computer 27a) receives video inputs $V_S$ and audion inputs $A_S$. from computer 27a at the satellite fueling facility over ISDN line 29. The attendant views his selected camera output on a video monitor 19. Audio A, from the customer is received by a speaker 40. An additional camera 41 captures the face of the attendant and a microphone 42 enables the attendant to speak to the customer. Control keyboard 43 enables the attendant to select which video (and from which dispenser) he desires to view on attendant's monitor 19, and additionally which output from digitally-controlled video switch 31 (FIG. 2) is sent to the appropriate display 24 on a selected dispenser 20. These selections are relayed to computer 27a via ISDN line 29.

The video intercommunication system described herein enables a customer at the fueling (satellite) facility to maintain interactive voice and video communications with an attendant who is physically situated at the remote (monitoring) location. As shown in FIG. 2, the video intercommunication system has the added feature of allowing the attendant at the remote location to play pre-recorded messages/advertisements, by means of a laser disk player 32, for viewing by customers on one or more of the video displays 24 at the fueling facility when a video display 24 is not being otherwise used by a customer pumping gas. A customer seeking assistance can interrupt the messages appearing on his display 24 by pressing the call button 23 which initiates the interactive process.

The outputs of the dispenser micro camera 11 and security cameras 10a, 10b are fed into Video/Audio switch box 25 which switches between the camera outputs on a timed basis (e.g., every 10–15 seconds) and allows the attendant at the remote site to select, through his computer 27b, the output which he wants to view. The signals from push-button to two-wire converter 23a are input to distribution box 26, the output of which is transmitted to personal computer 27a. The video signals from switch box are relayed to the computer 27a via video line $V_S$. Audio signals are transmitted by a modem to the computer 27a via audio line $A_S$. These signals are then transmitted by a modem to computer 27b located at the remote (attended) site via ISDN line 29 for viewing and listening by the attendant after demodulation by a modem at the remote site.

The computer 27a, which may be, for example, a Picture Tel PCS 50equipped with a Pentium 100 microprocessor having 16M RAM and a 1G hard drive and a Picture Tel video modem, Model No. VM50, receives audio and visual signals, $A_S$ and $V_S$, of and from the customer and transmits them to computer 27b (which may be identical to computer 27a) at the attended site by means of ISDN line 29. At the remote site, computer 27b receives the output of computer 27a (video and audio of the customer), displays the video $V_S$ on the monitor 19 and sends the audio $A_S$ to the speaker 40. Computer 27b simultaneously sends video VR (from camera 41) and audio $A_R$ of the attendant back to computer 27a over ISDN line 29. The audio portion $A_R$, from computer 27b, is sent directly to distribution box B 34 and the video portion $V_R$ is sent to distribution box B 34 via VGA/NTSC converter 30 which converts the standard VGA output of the computer 27a into an NTSC format which the video display 24 can handle. The output 34a of distribution box B 34 is input to a digitally-controlled video switch 31. Another audio/visual input 33a (e.g., messages, advertising, etc.) is received by video switch 31 from a laser disc player 32 via distribution box A 33 which receives video signals V and audio signals A from laser disc player 32. Video Switch 31 is programmed to translate signals 33a, 34a received from distribution boxes A and B (33, 34) and from control line 35 into visual and/or audio presentations on video display 24 upon command by the attendant via computer 27b. That is, the signal from control line 35 determines which output, 33a or 34a, is received on video display 24 at a fuel dispenser for viewing by a customer.

Signals from computer 27b (selecting the output desired by the attendant for display on the video display 24) are relayed to computer 27a over ISDN line 29 and are then sent to digitally-controlled video switch 31 over control line 35 after being converted by parallel-to-serial converter 36. Control line 35 therefore controls which output (either Video Distribution Box A or B) is sent to the output of switch 31 and in transmitted to a video display 24 for viewing by a customer.

Distribution Box 26, digitally-controlled video switch 31, video distribution boxes A and B, 33, 34 and VGA-to-NTSC converter 30 are manufactured by Gilbarco.

As a safety feature, the fueling facility includes a fire suppression system (not shown) which is incorporated into each dispenser and is designed to activate automatically in case of a fire.

I claim:

1. A remotely attended fuel dispenser comprising:
   a fuel dispenser located at a satellite site, said fuel dispenser being adapted to accept a credit card input via electronic communication lines for charging a monetary amount to a purchaser's account or for directly debiting said purchaser's account;
   a first video camera mounted in said fuel dispenser for taking video images of said purchaser while said purchaser is at said fuel dispenser;
   means for converting said video images of said first video camera to a digital presentation;
   means for transmitting said digital presentation of said video images of said first video camera to a location which is remote from said satellite site;
   means located at said remote location for converting said digital presentation of said video images of said first video camera to video images;
   video display means located at said remote location for receiving and monitoring said video images of said first video camera;
   a second video camera located at said remote location for taking video images of an attendant at said remote location;
   means for converting said video images of said second video camera to a digital presentation;
   means for transmitting said digital presentation of said video images of said second video camera to said satellite site;
   means located at said satellite site for converting said digital presentation of said video images of said second video camera to video images;
   means for transmitting said video images of said second video camera to said fuel dispenser for viewing by said purchaser;
   video display means located at said fuel dispenser for receiving and monitoring said video images of said second video cameras;

means for maintaining voice communication between said purchaser and said attendant while viewing each other's image;

a third video camera located at said satellite site for taking video images of said satellite site;

means for converting said video images of said third video camera to a digital presentation;

means for transmitting said digital presentation of said video images of said third video camera to a location which is remote from said satellite site;

means located at said remote location for converting said digital presentation of said video images of said third video camera to video images;

video display means located at said remote location for receiving and monitoring said video images of said third video camera; and a video recorder for recording said video images captured by said first, second and third video cameras.

2. A remotely attended fuel dispenser comprising:

a fuel dispenser located at a satellite site said fuel dispenser being adapted to receive a cash payment and return change therefor;

a first video camera mounted in said fuel dispenser for taking video images of said purchaser while said purchaser is at said fuel dispenser;

means for converting said video images of said first video camera to a digital presentation;

means for transmitting said digital presentation of said video images of said first video camera to a location which is remote from said satellite site;

means located at said remote location for converting said digital presentation of said video images of said first video camera to video images;

video display means located at said remote location for receiving and monitoring said video images of said first video camera;

a second video camera located at said remote location for taking video images of an attendant at said remote location;

means for converting said video images of said second video camera to a digital presentation;

means for transmitting said digital presentation of said video images of said second video camera to said satellite site;

means located at said satellite site for converting said digital presentation of said video images of said second video camera to video images;

means for transmitting said video images of said second video camera to said fuel dispenser for viewing by said purchaser;

video display means located at said fuel dispenser for receiving and monitoring said video images of said second video cameras;

means for maintaining voice communication between said purchaser and said attendant while viewing each other's image;

a third video camera located at said satellite site for taking video images of said satellite site;

means for converting said video images of said third video camera to a digital presentation;

means for transmitting said digital presentation of said video images of said third video camera to a location which is remote from said satellite site;

means located at said remote location for converting said digital presentation of said video images of said third video camera to video images;

video display means located at said remote location for receiving and monitoring said video images of said third video camera; and a video recorder for recording said video images captured by said first, second and third video cameras.

3. A remotely attended service station comprising:

a fuel dispenser located at a satellite site, said fuel dispenser having communication lines and adapted to accept a credit card input via said communication lines for charging a monetary amount to a purchaser's account or directly debiting said purchaser's account or adapted to receive a cash payment and return change therefor;

a first video camera mounted in said fuel dispenser for taking video images of said purchaser while said purchaser is at said fuel dispenser;

means for converting said video images of said first video camera to a digital presentation;

means for transmitting said digital presentation of said video images of said first video camera to a location which is remote from said satellite site;

means located at said remote location for converting said digital presentation of said video images of said first video camera to video images;

video display means located at said remote location for receiving and monitoring said video images of said first video camera;

a second video camera located at said remote location for taking video images of an attendant at said remote location;

means for converting said video images of said second video camera to a digital presentation;

means for transmitting said digital presentation of said video images of said second video camera to said satellite site;

means located at said satellite site for converting said digital presentation of said video images of said second video camera to video images;

means for transmitting said video images of said second video camera to said fuel dispenser for viewing by said purchaser;

video display means located at said fuel dispenser for receiving and monitoring said video images of said second video cameras;

means for maintaining voice communication between said purchaser and said attendant while viewing each other's image;

a third video camera located at said satellite site for taking video images of said satellite site;

means for converting said video images of said third video camera to a digital presentation;

means for transmitting said digital presentation of said video images of said third video camera to a location which is remote from said satellite site;

means located at said remote location for converting said digital presentation of said video images of said third video camera to video images;

video display means located at said remote location for receiving and monitoring said video images of said third video camera; and a video recorder for recording said video images captured by said first, second and third cameras.

\* \* \* \* \*